United States Patent
Matsumoto (10) Patent No.: US 8,947,733 B2
(45) Date of Patent: Feb. 3, 2015

(54) COLOR CONVERSION APPARATUS, COLOR CONVERSION METHOD, AND RECORDING MEDIUM

(71) Applicant: FUJIFILM Corporation, Tokyo (JP)

(72) Inventor: Tsuyoshi Matsumoto, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/972,299

(22) Filed: Aug. 21, 2013

(65) Prior Publication Data

US 2013/0335760 A1    Dec. 19, 2013

Related U.S. Application Data

(63) Continuation of application No. PCT/JP2012/050623, filed on Jan. 13, 2012.

(30) Foreign Application Priority Data

Mar. 1, 2011    (JP) ................. 2011-044261

(51) Int. Cl.
| | |
|---|---|
| G06F 15/00 | (2006.01) |
| G06K 1/00 | (2006.01) |
| H04N 1/60 | (2006.01) |

(52) U.S. Cl.
CPC ............. H04N 1/60 (2013.01); H04N 1/6022 (2013.01)
USPC ........................................................ 358/1.9

(58) Field of Classification Search
None
See application file for complete search history.

(56) References Cited

U.S. PATENT DOCUMENTS

| | | | |
|---|---|---|---|
| 2005/0206979 A1* | 9/2005 | Tomizawa et al. | 358/518 |
| 2006/0215905 A1 | 9/2006 | Kitamura et al. | |
| 2009/0195845 A1* | 8/2009 | Hoshii et al. | 358/518 |

FOREIGN PATENT DOCUMENTS

| | | |
|---|---|---|
| JP | 10-044475 A | 2/1998 |
| JP | 2001-157066 A | 6/2001 |
| JP | 2006-285959 A | 10/2006 |
| JP | 2007-235661 A | 9/2007 |
| JP | 2007-251661 A | 9/2007 |
| JP | 2009-241609 A | 10/2009 |

OTHER PUBLICATIONS

International Search Report mailed on Feb. 14, 2012, issued in PCT/JP2012/050623.
PCT/ISA/237 mailed on Feb. 14, 2012, issued in PCT/JP2012/050623.
Japanese Office Action for Japanese Application No. 2013-502208 dated Sep. 2, 2014 (with English translation).

* cited by examiner

Primary Examiner — Benny Q Tieu
Assistant Examiner — Michael Burleson
(74) Attorney, Agent, or Firm — Birch, Stewart, Kolasch & Birch, LLP (57) ABSTRACT

Device color signals are converted such that a total amount of used color materials in the first image area, in which image granularity is more important, is not reduced from a total amount before the device color signals are converted, and/or such that a total amount of used color materials in the second image area, in which cost of the used color materials is more important, is not increased from a total amount before the device color signals are converted.

16 Claims, 8 Drawing Sheets

COLOR CONVERSION APPARATUS, COLOR CONVERSION METHOD, AND RECORDING MEDIUM

CROSS-REFERENCE TO RELATED APPLICATIONS AND PRIORITY CLAIMS

This application is a Continuation of International Application No. PCT/JP2012/050623 filed on Jan. 13, 2012, which was published under PCT Article 21(2) in Japanese, which is based upon and claims the benefit of priority from Japanese Patent Application No. 2011-044261 filed on Mar. 1, 2011, the contents all of which are incorporated herein by reference.

TECHNICAL FIELD

The present invention relates to a color conversion apparatus, a color conversion method, and a recording medium for converting colors of a print produced using a plurality of color materials.

BACKGROUND ART

With significant advances in inkjet technology in recent years, it has become possible for inkjet image forming devices to produce large color prints of high quality at high speeds. Such inkjet image forming devices are widely used particularly in sign and display applications, and are applicable, for example, to prints on POP (Point Of Purchase) posters, wall posters, outdoor advertisements, billboards, etc. Such inkjet image forming devices are capable of producing prints by forming a number of ink dots of several tens μm in diameter on a print medium by applying droplets of inks in different colors, e.g., C, M, Y, K inks, to the print medium.

It is known in the art that, according to human visual response characteristics, human color vision is most sensitive to shades of gray. More specifically, if dots printed in different colors are of the same size, then dots in a K colored ink can be perceived better visually than dots in other C, M, Y colored inks. Therefore, the observer of an image produced using an increased amount of K colored ink sees the image as grainy in its entirety (granularity is high), although the observer cannot identify the individual dots.

If dots printed in C, M, Y colored inks are placed closely together to form gray areas (composite black areas), then such dots provide a smoothing effect due to being superimposed on each other, thereby lowering image granularity. However, since three inks are used rather than one ink, the total amount of inks used increases, resulting in a high running cost (hereinafter referred to simply as an increased "cost").

According to inkjet technology, therefore, there is a trade-off between granularity and cost, and it is important to design images so that granularity and cost of the images is well-balanced. Various color conversion techniques have been proposed in the art for appropriately controlling the total amount of inks used by finely adjusting the dot recording ratio while keeping the dots substantially isochromatic.

Japanese Laid-Open Patent Publication No. 2009-241609 discloses an apparatus for and a method of judging whether chromatic or achromatic dots are to be formed based on an input signal. The publication states that a pale K ink is used instead of a dark K ink in a color area where dot shapes are visible, thereby increasing granularity.

Japanese Laid-Open Patent Publication No. 10-044475 discloses an apparatus for and a method of correcting the amount of each recorded ink in order to increase the density of a certain ink (a Y ink among C, M, Y, K inks) the granularity of which is least visible.

SUMMARY OF INVENTION

Input signals, based on which prints are produced, are available in several different attributes and types. One image area includes regions in which many more noticeable colors are present, and other regions in which many less noticeable colors are present. One image area also includes regions in which many low spatial frequency components are present, and other regions in which many high spatial frequency components are present.

According to the apparatuses and methods disclosed in Japanese Laid-Open Patent Publication No. 2009-241609 and Japanese Laid-Open Patent Publication No. 10-044475, combinations of color materials simply are changed depending on whether or not they belong to a certain color area. In certain input images, granularity and cost may not be well balanced, but only one of granularity or cost is improved depending on the image characteristics.

The present invention has been made in order to solve the above problems. An object of the present invention is to provide a color conversion apparatus, a color conversion method, and a recording medium, which are capable of producing prints that are both low in granularity and low in cost.

According to the present invention, there is provided a color conversion apparatus for converting colors of a print that is produced using a plurality of color materials, comprising a color signal input unit for inputting device color signals associated with respective amounts of the color materials, an image area extractor for extracting a first image area in which image granularity is more important and/or a second image area in which cost of used color materials is more important, from among an image area represented by the device color signals input by the color signal input unit, and an isochromatic converter for converting the device color signals representing the image area into new device color signals, so that the new device color signals will fall within an isochromatic range in a device-independent color space, wherein the isochromatic converter converts the device color signals such that a total amount of used color materials in the first image area extracted by the image area extractor is not reduced from a total amount before the device color signals are converted, and/or such that a total amount of the used color materials in the second image area extracted by the image area extractor is not increased from a total amount before the device color signals are converted.

As described above, the image area extractor extracts a first image area in which image granularity is more important and/or a second image area in which the cost of used color materials is more important, from among an image area represented by the device color signals, and the isochromatic converter converts the device color signals such that the total amount of used color materials in the first image area extracted by the image area extractor is not reduced from the total amount before the device color signals are converted, and/or such that the total amount of used color materials in the second image area extracted by the image area extractor is not increased from the total amount before the device color signals are converted. Accordingly, it is possible to produce a print that is both low in granularity and low in cost by selectively increasing or reducing the total amount of used color materials depending on the image area.

The image area extractor preferably extracts the first image area and/or the second image area, based on a contour of a given object detected in the image area. The isochromatic converter preferably designates one of a plurality of pixels within the image area as a pixel of interest, and converts the device color signals depending on whether or not the pixel of interest falls within the first image area and/or the second image area. The isochromatic converter preferably converts the device color signals such that the total amount of the used color materials in the first image area is increased from the total amount before the device color signals are converted.

If a total amount of used color materials in another image area apart from the first image area is to be reduced, the isochromatic converter preferably converts the device color signals in order to prevent the total amount of the used color materials in the first image area from being reduced.

The color materials preferably include an achromatic color material and a plurality of chromatic color materials, and if the chromatic color materials can be combined to reproduce a color on the print producible by the achromatic color material, the isochromatic converter preferably converts the device color signals such that an amount of used achromatic color material in the first image area is reduced from an amount before the device color signals are converted, and a total amount of used chromatic color materials in the first image area is increased from a total amount before the device color signals are converted. The granularity in the first image area can thus be improved by increasing the total amount of color materials used to produce a print.

The color conversion apparatus preferably further comprises an isochromatic range determiner for determining the isochromatic range, and the isochromatic converter preferably converts the device color signals so as to fall within the isochromatic range determined by the isochromatic range determiner, and so as to minimize the amount of used achromatic color material. Accordingly, granularity can be optimized in the isochromatic range.

The isochromatic converter preferably converts the device color signals such that the total amount of the used color materials in the second image area is reduced from the total amount before the device color signals are converted.

If the total amount of used color materials in another image area apart from the second image area is to be increased, the isochromatic converter preferably converts the device color signals in order to prevent the total amount of the used color materials in the second image area from being increased.

The color materials preferably include an achromatic color material and a plurality of chromatic color materials, and if the chromatic color materials can be combined to reproduce a color on the print producible by the achromatic color material, the isochromatic converter preferably converts the device color signals such that an amount of used achromatic color material in the second image area is increased from an amount before the device color signals are converted, and a total amount of used chromatic color materials in the second image area is reduced from a total amount before the device color signals are converted. Accordingly, the cost to produce the second image area can selectively be lowered by reducing the total amount of color materials used to produce a print.

The color conversion apparatus preferably further comprises an isochromatic range determiner for determining the isochromatic range, wherein the isochromatic converter preferably converts the device color signals so as to fall within the isochromatic range determined by the isochromatic range determiner, and so as to maximize the amount of the used achromatic color material. Thus, the cost of color materials used in the isochromatic range can be optimized.

The image area extractor preferably extracts, as the second image area, an image area that remains after the first image area is excluded from the image area. Thus, the total amount of used color materials can be reduced as much as possible, excluding the first image area in which image granularity is more important.

The image area extractor preferably extracts a facial area as the first image area.

The image area extractor preferably extracts, as the first image area, an achromatic flat area in which saturation is smaller than a first threshold value, and in which spatial frequency is lower than a second threshold value.

According to the present invention, there also is provided a color conversion method for converting colors of a print that is produced using a plurality of color materials, comprising using a computer to perform the steps of inputting device color signals associated with respective amounts of the color materials, extracting a first image area in which image granularity is more important and/or a second image area in which cost of used color materials is more important, from among an image area represented by the device color signals that have been input, and converting the device color signals representing the image area into new device color signals, so that the new device color signals will fall within an isochromatic range in a device-independent color space, wherein the step of converting comprises the step of converting the device color signals such that a total amount of used color materials in the extracted first image area is not reduced from a total amount before the device color signals are converted, and/or such that a total amount of the used color materials in the extracted second image area is not increased from a total amount before the device color signals are converted.

According to the present invention, there further is provided a non-transitory recording medium storing a program for converting colors of a print that is produced using a plurality of color materials, the program enabling a computer to function as a color signal input unit for inputting device color signals associated with respective amounts of the color materials, an image area extractor for extracting a first image area in which image granularity is more important and/or a second image area in which cost of used color materials is more important, from among an image area represented by the device color signals input by the color signal input unit, and an isochromatic converter for converting the device color signals representing the image area into new device color signals, so that the new device color signals will fall within an isochromatic range in a device-independent color space, wherein the isochromatic converter converts the device color signals such that a total amount of used color materials in the first image area extracted by the image area extractor is not reduced from a total amount before the device color signals are converted, and/or such that a total amount of the used color materials in the second image area extracted by the image area extractor is not increased from a total amount before the device color signals are converted.

With the color conversion apparatus, the color conversion method, and the recording medium according to the present invention, a first image area in which image granularity is more important and/or a second image area in which the cost of used color materials is more important is extracted from an image area represented by the device color signals, and the device color signals are converted such that the total amount of used color materials in the first image area is not reduced from the total amount before the device color signals are converted, and/or such that the total amount of used color materials in the second image area is not increased from the total amount before the device color signals are converted. Accordingly, it is possible to produce a print that is both low in granularity and low in cost, by selectively increasing or reducing the total amount of used color materials depending on the image area.

DESCRIPTION OF EMBODIMENTS

A color conversion method according to a preferred embodiment of the present invention, in relation to a color conversion apparatus and a printing system that carry out the color conversion method, will be described in detail below with reference to the accompanying drawings. In the descriptions that follow, forming an image may also be referred to simply as "printing".

Figure 1:
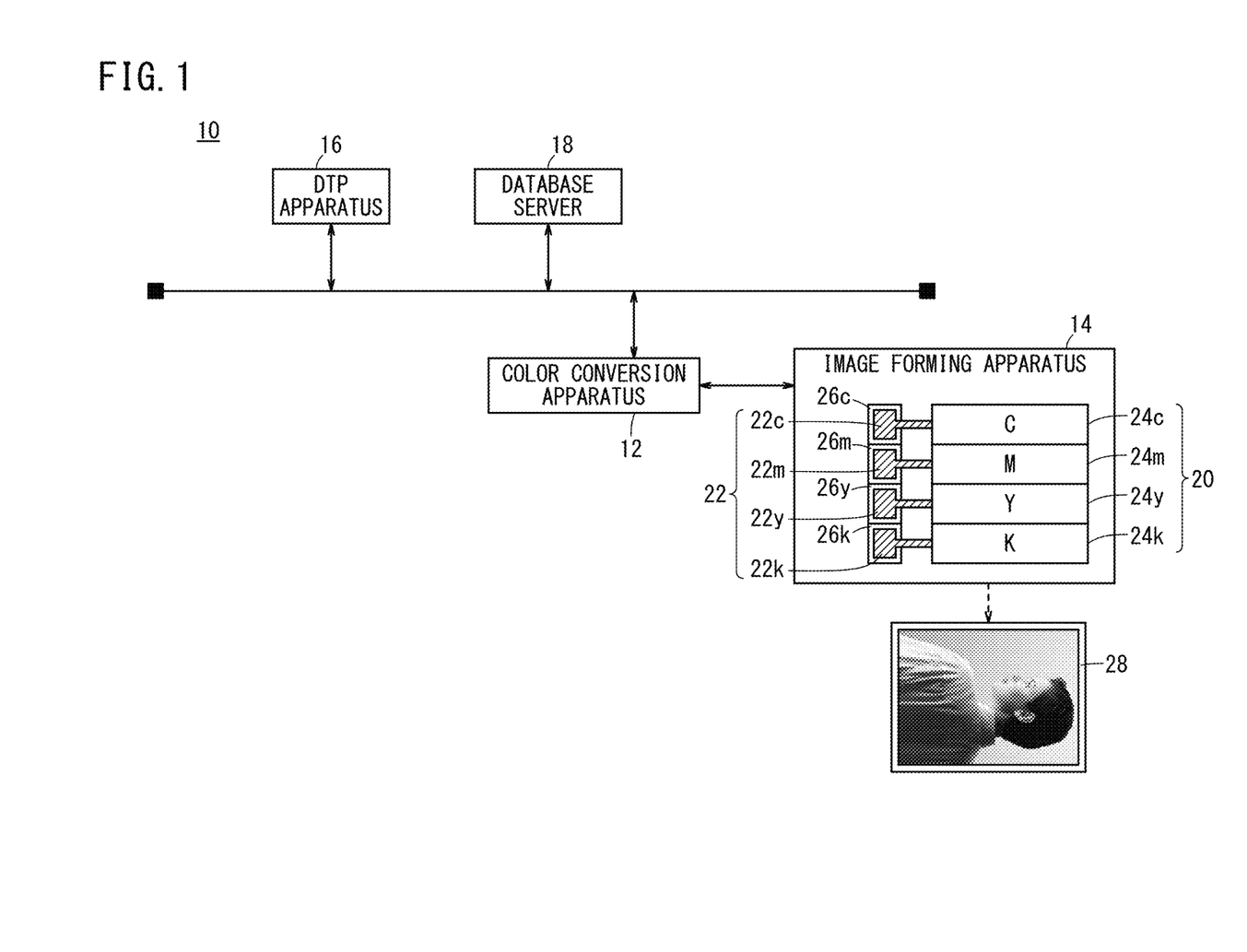
FIG. 1 is a block diagram of a printing system, which incorporates therein a color conversion apparatus according to an embodiment of the present invention.

FIG. 1 shows in block form a printing system 10, which incorporates therein a color conversion apparatus according to an embodiment of the present invention.

As shown in FIG. 1, the printing system 10 basically includes a color conversion apparatus 12 (computer), an image forming apparatus 14, a DTP (DeskTop Publishing) apparatus 16, and a database server 18. The color conversion apparatus 12, the DTP apparatus 16, and the database server 18 are connected electrically to each other through a wired or wireless link.

The color conversion apparatus 12 converts input image data (device color signals or page description data) supplied from an external apparatus into device color signals, which are suitable for use in the image forming apparatus 14 to produce a print based thereon. The color conversion apparatus 12 outputs the converted device color signals to the image forming apparatus 14. The device color signals represent image data defined as device-dependent data, e.g., raster-format data, such as TIFF data, bitmap data, RAW data, or the like, and having color channels in four colors of C, M, Y, K or three colors of R, G, B. The device-dependent data supplied to the image forming apparatus 14 may also have a unique data format with a desired header added thereto.

The image forming apparatus 14 is electrically connected to the color conversion apparatus 12 through a serial interface such as a USB (Universal Serial Bus) cable, an IEEE1394 cable, an Ethernet (registered trademark) cable, a wireless network, or the like, or a parallel interface such as a Centronics cable.

The image forming apparatus 14 is an inkjet printer for forming an image on a medium (recording medium), not shown, by discharging ink droplets from a recording head assembly 20 while the medium is fed in a predetermined direction. The medium has a base, which comprises a paper medium such as synthetic paper, thick paper, aluminum-evaporated paper, or the like, a resin medium such as vinyl chloride, PET, or the like, or tarpaulin paper, or the like.

The recording head assembly 20 comprises four line heads 24$c$, 24$m$, 24$y$, 24$k$ for discharging droplets of four color materials of different colors, comprising a C ink 22$c$ (chromatic color material), an M ink 22$m$ (chromatic color material), a Y ink 22$y$ (chromatic color material), and a K ink 22$k$ (achromatic color material). The C ink 22$c$, the M ink 22$m$, the Y ink 22$y$, and the K ink 22$k$ may hereinafter be referred to collectively as "inks 22".

Each of the line heads 24$c$, 24$m$, 24$y$, 24$k$ has a plurality of nozzles, not shown, arrayed along the widthwise direction of the medium. The C ink 22$c$, the M ink 22$m$, the Y ink 22$y$, and the K ink 22$k$ are stored in respective ink tanks 26$c$, 26$m$, 26$y$, 26$k$. The line head 24$c$ discharges the C ink 22$c$ supplied from the ink tank 26$c$ through the nozzles thereof. The line head 24$m$ discharges the M ink 22$m$ supplied from the ink tank 26$m$ through the nozzles thereof. The line head 24$y$ discharges the Y ink 22$y$ supplied from the ink tank 26$y$ through the nozzles thereof. The line head 24$k$ discharges the K ink 22$k$ supplied from the ink tank 26$k$ through the nozzles thereof.

The recording head assembly 20 may have an ink droplet propelling mechanism of any of various different types. For example, the recording head assembly 20 may have an actuator in the form of a piezoelectric device as an ink droplet propelling mechanism, which propels and ejects droplets of inks 22 upon mechanical deformation thereof based on a control signal. Alternatively, the recording head assembly 20 may have a thermal jet mechanism as an ink droplet propelling mechanism, which propels and ejects droplets of inks 22 under the pressure of air bubbles that are generated upon the inks 22 being heated by a heater. The recording head assembly 20 is not limited to a line head assembly, but may be a multipass head assembly for reciprocally scanning the medium transversely to form an image on the medium.

The DTP apparatus 16 is capable of editing material data made up of characters, figures, pictures, photos, etc. The DTP apparatus 16 generates electronic manuscripts in a page description language (hereinafter referred to as "PDL") by laying out the material data on each page. PDL refers to a language which is descriptive of image information including format information, position information, color information (including density information), etc., of characters, figures, etc., in a "page" that serves as an output unit for printing, displaying, or the like. The DTP apparatus 16 performs a rasterizing process on electronic manuscripts described in PDL format. The rasterizing process includes a data format converting process for converting PDL format data into raster format data, and a color converting process using a target profile.

The database server 18 is an apparatus for managing data such as job tickets of electronic manuscripts, e.g., JDF (Job Definition Format) files, color sample data, target profiles, or device profiles suitable for a combination of the image forming apparatus 14 and the medium.

Figure 2:
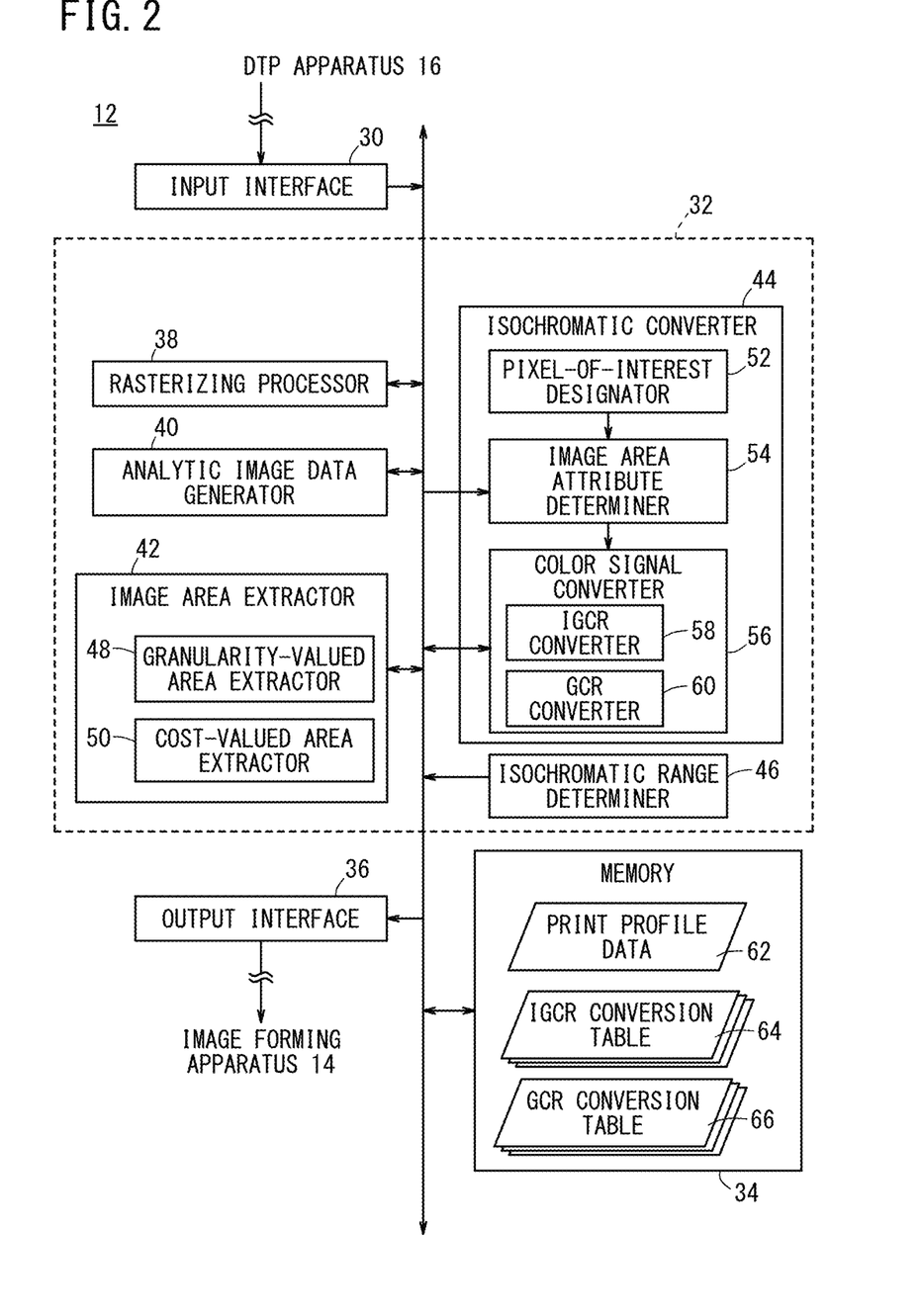
FIG. 2 is an electric block diagram of the color conversion apparatus shown in FIG. 1.

FIG. 2 is an electric block diagram of the color conversion apparatus 12 shown in FIG. 1.

The color conversion apparatus 12 includes an input interface 30 (color signal input unit), a controller 32, a memory 34 (recording medium), and an output interface 36. The memory 34 stores a program for controlling the controller 32 to function as the color conversion apparatus according to the present embodiment.

The input interface 30 receives electric signals from external apparatus. For example, the input interface 30 acquires device color signals and PDL data, which are edited and generated by the DTP apparatus 16, and also acquires various items of information such as ICC (International Color Consortium) profiles or the like stored in the database server 18.

The output interface 36 sends electric signals to external apparatus. For example, the output interface 36 supplies device color signals to the image forming apparatus 14, which have been processed by a color conversion process according to the present invention.

The color conversion process is a process for converting only the signal value of a device color signal without changing the types of color plates (e.g., C, M, Y, K signal data). A device color signal prior to conversion thereof will hereinafter be referred to as a "pre-conversion color signal", and a device color signal after conversion thereof will be referred to as a "post-conversion color signal".

The input and output device color signals (pre-conversion color signals and post-conversion color signals) are associated with respective amounts of used inks 22 in the image forming apparatus 14. Such an association may be desirable for each color channel. For example, the used amount "0%" may be assigned to a device color signal representing a lowest gradation level, and the used amount "100%" may be assigned to a device color signal representing a highest gradation level. Linearly changing used amounts may be assigned to device color signals representing intermediate gradation levels between the lowest and highest gradation levels.

The controller 32, which comprises an information processor such as a CPU or the like, includes a rasterizing processor 38, an analytic image data generator 40, an image area extractor 42, an isochromatic converter 44, and an isochromatic range determiner 46.

The rasterizing processor 38 carries out the same rasterizing function as the DTP apparatus 16. The rasterizing processor 38 performs a rasterizing process on input data depending on the type of input data. If device color signals are directly supplied to the input interface 30, then the rasterizing processor 38 does not need to perform a rasterizing process on the input data.

The analytic image data generator 40 generates analytic image data from a pre-conversion color signal, which is acquired from the input interface 30 or the rasterizing processor 38. More specifically, the analytic image data generator 40 performs a color conversion process for converting the pre-conversion color signal into device-independent data. The term device-independent data refers to data defined in a color system, such as HSV (Hue-Saturation-Value), HLS (Hue-Lightness-Saturation), CIELAB, CIELUV, XYZ, or the like.

The analytic image data generator 40 generates L*a*b* data, YCC data, or the like from the pre-conversion color signal using print profiles depending on the image forming apparatus 14, for example.

The image area extractor 42 includes a granularity-valued area extractor 48 for extracting from a given image area a first image area in which image granularity is more important, and a cost-valued area extractor 50 for extracting from the given image area a second image area in which the cost of used inks 22 is more important.

In the first image area, a color conversion process is carried out so as not to reduce the total amount of used inks 22. In other words, the first image area refers to an image area, which is specified to improve dot-induced granularity or to prevent granularity from increasing, by increasing or maintaining the total amount of used inks 22.

In the second image area, a color conversion process is carried out so as not to increase the total amount of used inks 22. In other words, the second image area refers to an image area, which is specified to reduce the cost of used inks 22 or to prevent the cost of used inks 22 from increasing, by reducing or maintaining the total amount of used inks 22.

The isochromatic converter 44 includes a pixel-of-interest designator 52 for designating one of a plurality of pixels in an image area represented by device color signals, an image area attribute determiner 54 for determining an image area attribute of a given pixel (a pixel of interest), and a color signal converter 56 for converting device color signals into new device color signals.

The color signal converter 56 includes an IGCR (Inverse Gray-Component Replacement) converter 58 for carrying out an IGCR conversion process, and a GCR (Gray-Component Replacement) converter 60 for carrying out a GCR conversion process. The IGCR conversion process and the GCR conversion process are effective in the present embodiment (see the image forming apparatus 14 shown in FIG. 1) in cases where the C ink 22$c$, the M ink 22$m$, and the Y ink 22$y$, which are chromatic color materials, can be combined to reproduce a color on the print 28 producible by the K ink 22$k$, which is an achromatic color material. Details of the IGCR conversion process and the GCR conversion process will be described later.

The memory 34 stores print profile data 62 suitable for the image forming apparatus 14, an IGCR conversion table 64 used in the IGCR conversion process, and a GCR conversion table 66 used in the GCR conversion process. The memory 34 may additionally store pre-conversion color signals, post-conversion color signals, analytic image data, and various items of information required for the color conversion process according to the present invention.

The color conversion apparatus 12 according to the present embodiment is basically configured as described above. Operations of the color conversion apparatus 12 will be described in detail below with reference to the flowchart shown in FIG. 3.

Figure 3:
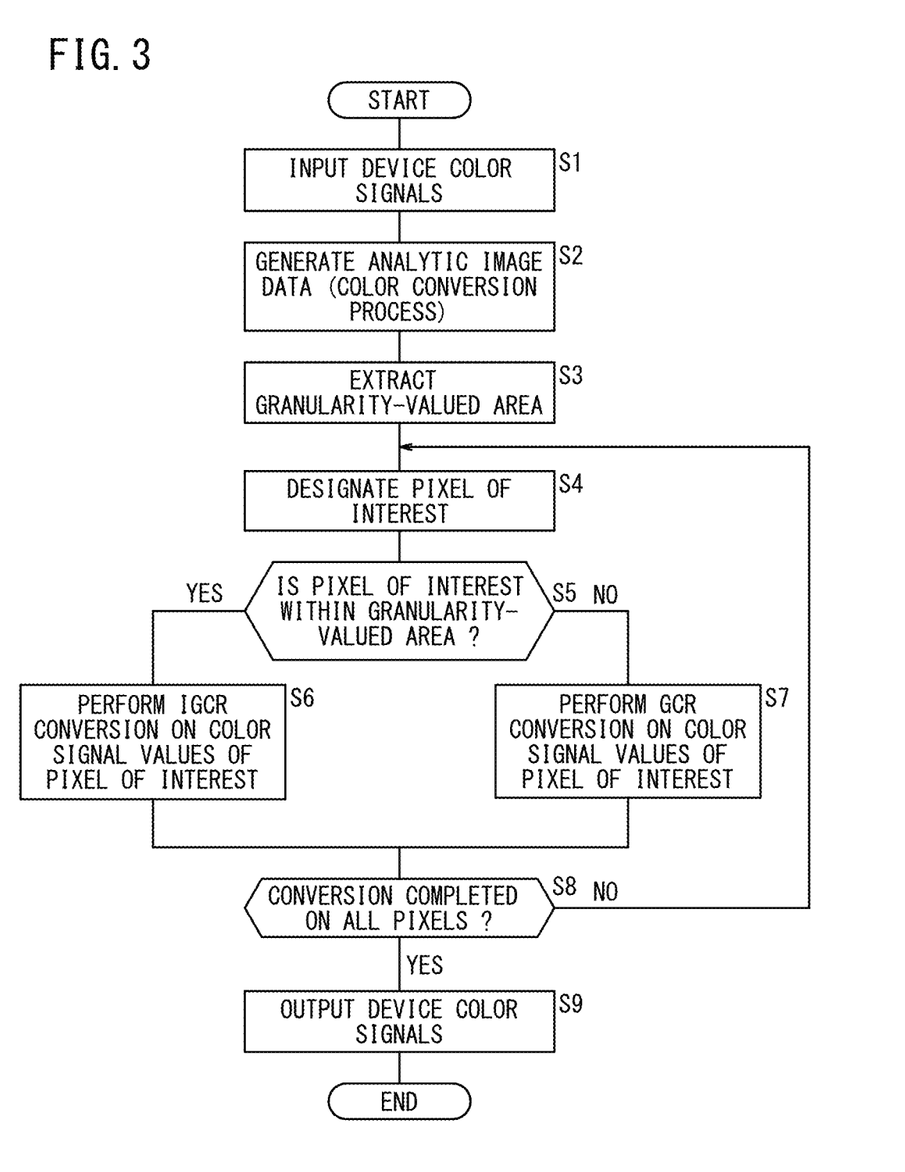
FIG. 3 is a flowchart of an operation sequence implemented by the color conversion apparatus.

First, device color signals are input to the color conversion apparatus 12 through the input interface 30 (step S1). The color conversion apparatus 12 is supplied with device color signals in two signal entry modes.

According to the first signal entry mode, the DTP apparatus 16 generates a PDL electronic manuscript according to an editing process, and then rasterizes the generated PDL electronic manuscript into device color signals, i.e., C, M, Y, K signal data, for use in printing. The generated device color signals are supplied from the DTP apparatus 16 to the color conversion apparatus 12 through the input interface 30.

According to the second signal entry mode, the DTP apparatus 16 generates a PDL electronic manuscript according to an editing process, and then supplies the generated PDL electronic manuscript to the image forming apparatus 14. Thereafter, the rasterizing processor 38 reads the print profile data 62 stored in the memory 34, and rasterizes the supplied PDL electronic manuscript into device color signals, i.e., C, M, Y, K signal data, for use in printing.

Thereafter, the analytic image data generator 40 performs a given color conversion process on the device color signal in order to generate analytic image data (step S2). The analytic image data generator 40 generates, for example, YCC data for use in a later-described face detecting process, and L*a*b* data for use in a later-described isochromatic conversion process.

The supplied device color signals and the generated analytic image data are temporarily stored in the memory 34.

Thereafter, the image area extractor 42 extracts a granularity-valued area in which image granularity is more important from an image area represented by the device color signals (step S3). More specifically, the granularity-valued area extractor 48 reads the device color signals and the analytic image data from the memory 34, and then applies various image detecting algorithms to the device color signals and the analytic image data to extract a granularity-valued area. Specific examples of the image detecting algorithms will be described below.

In the first example, a detected facial area may be set as a granularity-valued area, due to the fact that the human face is a typical object, the image quality of which can easily be evaluated as good or bad.

A facial area may be detected by any of various known image processing techniques disclosed in Japanese Laid-Open Patent Publication No. 2006-285959 and Japanese Laid-Open Patent Publication No. 2007-148537. The analytic image data that are used to detect the facial area may be any of various types. For example, if YCC data are used, then a known detecting process incorporated in an input device such as a digital camera or the like may be applied as is.

In the second example, an achromatic flat area may be set as a granularity-valued area, due to the fact that human visual response characteristics (contrast resolution) are maximum for gray colors and a spatial frequency band in the vicinity of 1.0 Cy/mm. An achromatic flat area refers to an image area in which saturation is smaller than a first threshold value and in which the spatial frequency is lower than a second threshold value. More specifically, the first threshold value may be 5 and the second threshold value may be 1.0 Cy/mm (the number of corresponding pixels varies depending on resolution). The first and second threshold values are not limited to the above values, and may be set to desired values depending on printing conditions and the manner in which the print will be observed.

In the third example, a flat image area having a memory color may be set as a granularity-valued area. The term memory color refers to a color which is recalled and stored in association with something by a human observer. For example, the memory color associated with the human face is a flesh tone color, the memory color associated with a sunset glow is orange, and the memory color associated with cherry flowers is pink. A flat image area may be detected not only in view of the color of the image area, but also in view of other attributes of the scene.

In the second and third examples, the flat area may be detected according to any of known pattern detecting algorithms including a Fourier transform, a wavelet transform, a pattern matching algorithm, and a static process, etc. In addition, the flat area may be detected as a cluster of pixels by performing a joined component labeling process on the analytic image data or the device color signals.

Figure 4A:
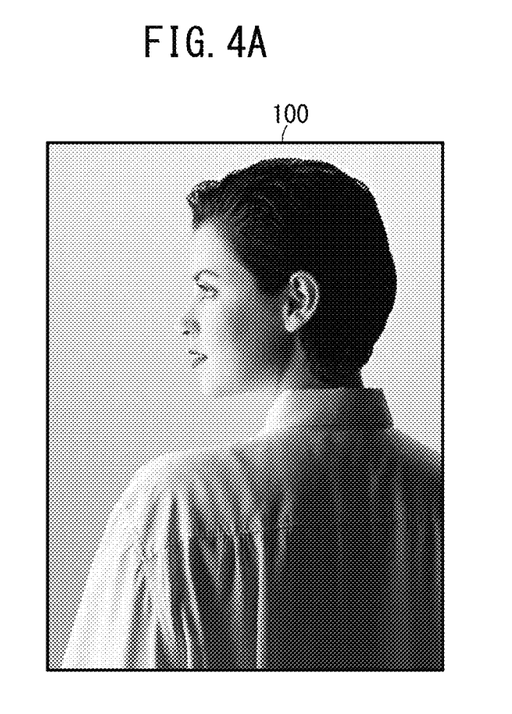
FIG. 4A is a view showing a visual image, which is represented by device color signals.

In this manner, a granularity-valued area is extracted from an image area 100 shown in FIG. 4A. FIG. 4A is a view showing a visual image, which is represented by device color signals. The image area 100 represents a natural picture of the upper half of the body of an upstanding woman positioned substantially in the center of the image area 100.

Figure 4B:
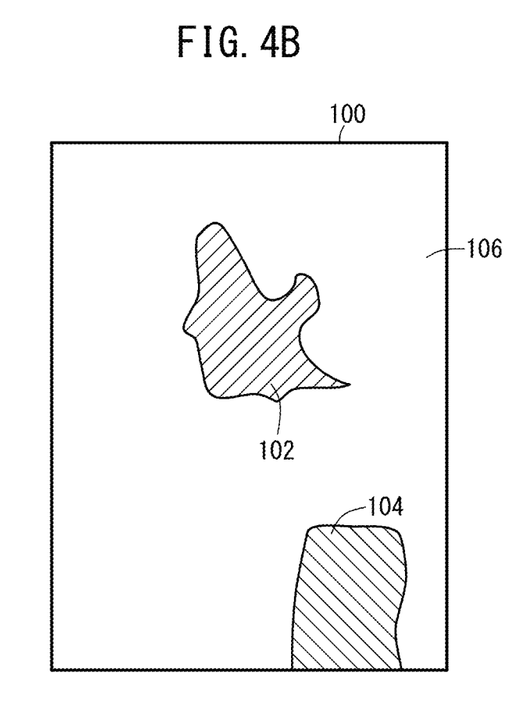
FIG. 4B is a view showing first image areas, which are extracted by an image area extractor shown in FIG. 2.

FIG. 4B is a view showing first image areas 102 and 104, which are extracted from the image area 100 by the image area extractor 42. The first image area 102, which is located substantially centrally in the image area 100, corresponds to a detected facial area. The first image area 104, which is located in a lower right region of the image area 100, corresponds to a detected achromatic flat area.

The cost-valued area extractor 50 extracts a cost-valued area from the image area 100, in which the cost of used inks 22 is more important. The cost-valued area is a second image area 106, which is illustrated as a blank area in FIG. 4B. The second image area 106 is an image area that remains after the first image areas 102, 104 have been excluded from the image area 100. Therefore, the total amount of used inks 22 in the image area 100 can be minimized, except for the first image areas 102, 104 in which image granularity is more important. The image area extractor 42 supplies area attribute information (a granularity-valued area or a cost-value area) for each pixel of the image area 100 to the memory 34, which temporarily stores the supplied area attribute information.

In this manner, the image area extractor 42 extracts a granularity-valued area from the image area 100 (step S3). In steps S4 through S8, color signal values of the device color signals are converted successively for each pixel.

The pixel-of-interest designator 52 designates one of a plurality of pixels within the image area 100 as a pixel of interest (step S4). For example, the pixel-of-interest designator 52 may designate a pixel according to an ascending order of addresses assigned to respective pixels of the image area 100. However, the pixel-of-interest designator 52 may designate a pixel according to any order.

Next, the image area attribute determiner 54 determines whether or not the present pixel of interest falls within a granularity-valued area (step S5). More specifically, the image area attribute determiner 54 may determine whether the present pixel of interest belongs to a granularity-valued area or a cost-valued area, by referring to information concerning the present pixel of interest from among the area attribute information read from the memory 34.

Thereafter, depending on the result determined by the image area attribute determiner 54, the color signal converter 56 selects a process for converting the color signal value of the pixel of interest. If the image area attribute determiner 54 determines that the present pixel of interest belongs to a granularity-valued area, the color signal converter 56 uses the IGCR conversion process (step S6). On the other hand, if the image area attribute determiner 54 determines that the present pixel of interest does not belong to a granularity-valued area, the color signal converter 56 uses the GCR conversion process (step S7).

Details of the IGCR conversion process and the GCR conversion process will be described below.

Figure 5A:
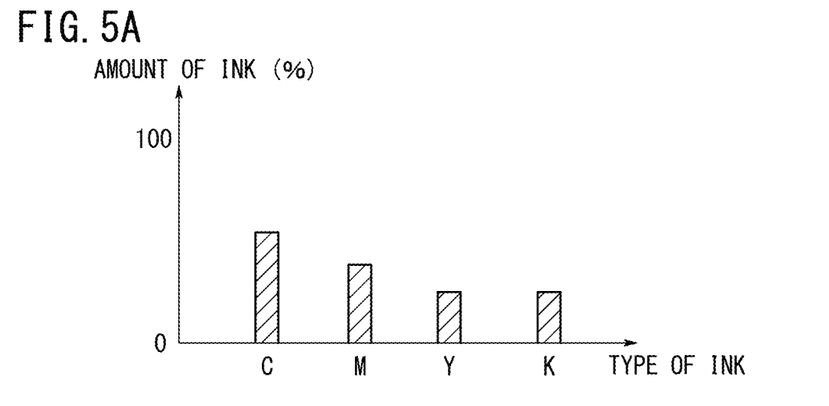
FIG. 5A is a graph showing the relationship between types and amounts of used inks prior to performing a conversion process.
Figure 5B:
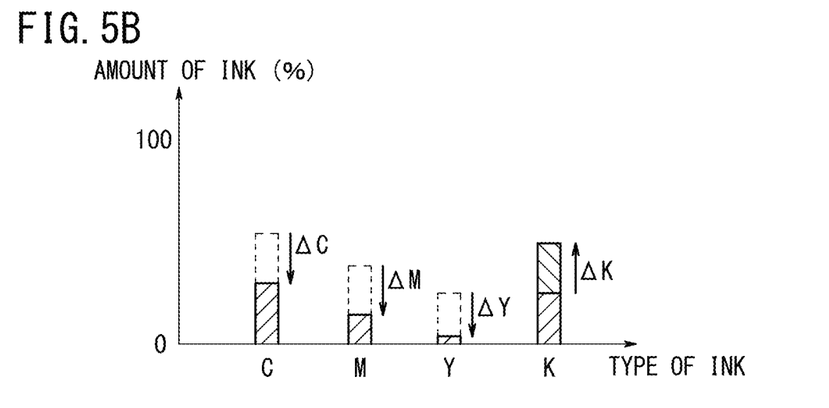
FIG. 5B is a graph showing the relationship between types and amounts of used inks after a GCR conversion process is performed.
Figure 5C:
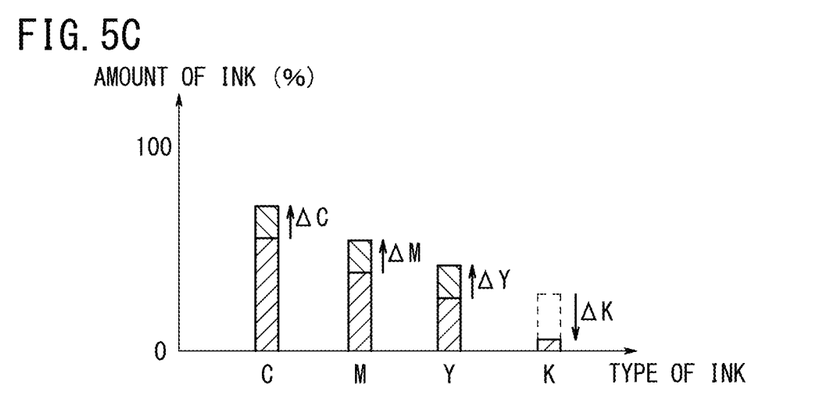
FIG. 5C is a graph showing the relationship between types and amounts of used inks after an IGCR conversion process is performed.

FIG. 5A is a graph showing a relationship between types of inks and amounts of used inks prior to performing a conversion process. FIG. 5B is a graph showing the relationship between types of inks and amounts of used inks after the GCR conversion process is performed. FIG. 5C is a graph showing the relationship between types of inks and amounts of used inks after the IGCR conversion process is performed.

In FIG. 5B, the amounts of the C ink 22c, the M ink 22m, and the Y ink 22y are reduced respectively by ΔC, ΔM, ΔY from the amounts of the C ink 22c, the M ink 22m, and the Y ink 22y shown in FIG. 4A. In order to cancel out a density reduction caused by such a reduction in the amounts of the inks 22, the K ink 22k is increased by ΔK. In this manner, the total amount of used inks 22 is reduced by (ΔC+ΔM+ΔY−ΔK) while the color reproducibility of the print 28 (see FIG. 1) is kept substantially constant.

In FIG. 5C, the amounts of the C ink 22c, the M ink 22m, and the Y ink 22y are increased respectively by ΔC, ΔM, ΔY from the amounts of the C ink 22c, the M ink 22m, and the Y ink 22y shown in FIG. 4A. In order to cancel out a density increase caused by such an increase in the amounts of the inks 22, the K ink 22k is reduced by ΔK. In this manner, the total amount of used inks 22 is increased by (ΔC+ΔM+ΔY−ΔK) while the color reproducibility of the print 28 (see FIG. 1) is kept substantially constant. Since the coverage ratio of the formed dots becomes higher, granularity is improved as a whole.

Figure 6:
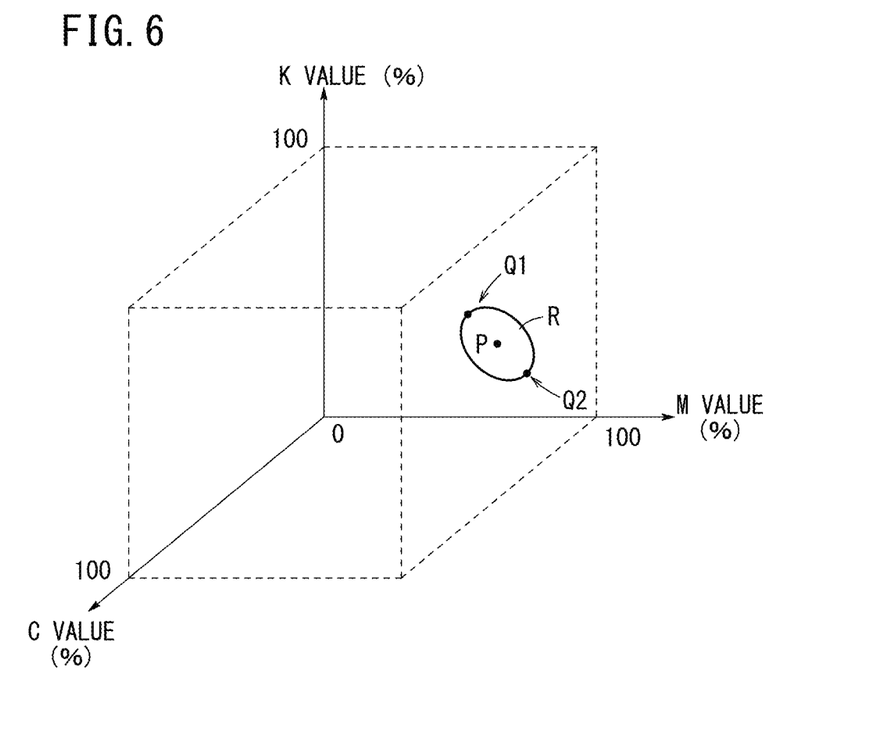
FIG. 6 is a diagram showing an isochromatic range within a device-independent color space.

FIG. 6 is a diagram showing an isochromatic range in a device-independent color space. In the present embodiment, the inks 22 are available in four types, i.e., C, M, Y, K. In FIG. 6, for illustrative purposes, the inks are available in three types, i.e., C, M, Y.

It is assumed that a point, which corresponds to a device color signal value prior to a conversion process, is denoted by P. In a device-independent color space, e.g., a L*a*b* color space, a range within which the color difference Δe with a color value corresponding to the point P is 0.5 or smaller is referred to as an isochromatic range R. In the color conversion process, any desired device color signal within the isochromatic range R is handled as being isochromatic with respect to the point P.

As shown in FIG. 6, a color that falls within the isochromatic range R around the point P and at which the K value (%) is maximum is represented by a point Q1. The GCR conversion table 66 is generated by determining points Q1 for each of respective points P in a device-dependent color space. A color that falls within the isochromatic range R around the point P and at which the K value (%) is minimum is represented by a point Q2. The IGCR conversion table 64 is generated by determining points Q2 for each of respective points P in a device-dependent color space.

The point Q1 and the point Q2 may be determined by any of various search algorithms. For example, using the print profile data 62 (see FIG. 2), L*a*b* color values may be calculated with respect to all colors in the vicinity of the point P, and then an optimum CMYK combination, which satisfies certain limiting conditions, may be determined. The optimum CMYK combination may be determined not only in view of color approximations, but also in view of gradation characteristics (e.g., continuity and smoothness of a gradation curve).

Figure 7A:
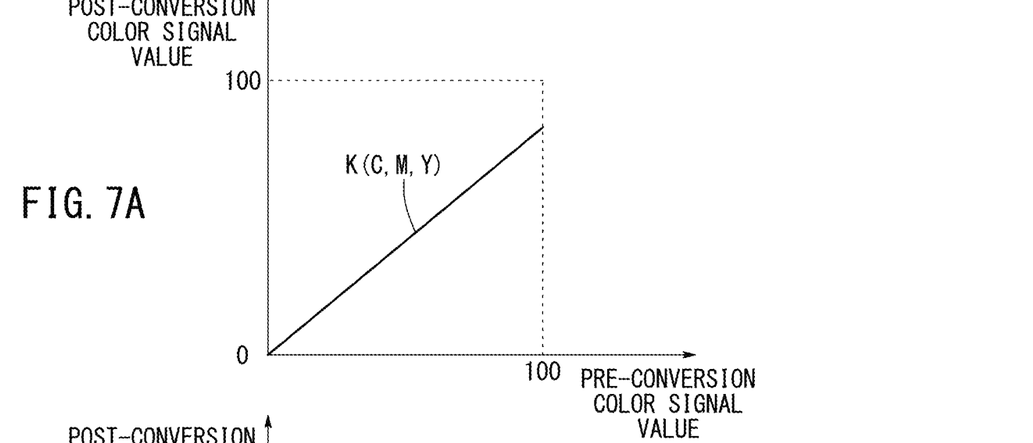
FIG. 7A is a graph showing conversion characteristics of an ordinary color conversion table for reproducing shades of gray.
Figure 7B:
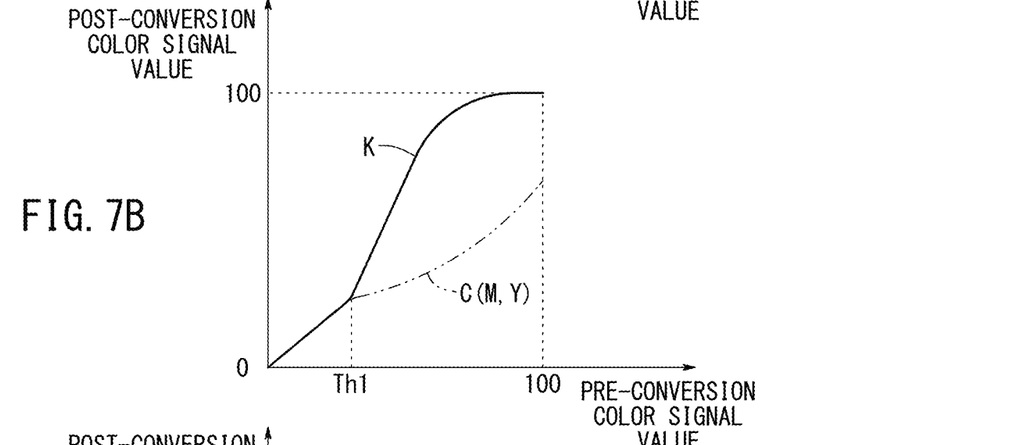
FIG. 7B is a graph showing conversion characteristics of a GCR color conversion table for reproducing shades of gray.
Figure 7C:
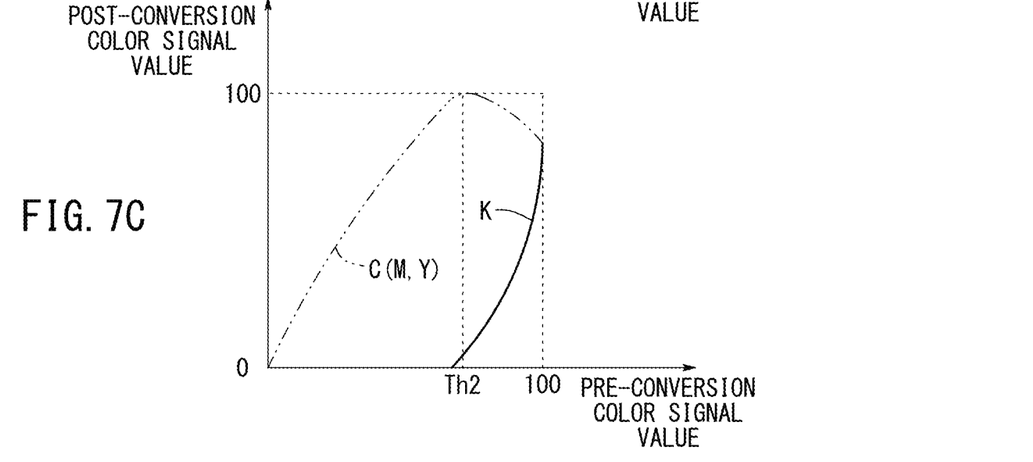
FIG. 7C is a graph showing conversion characteristics of an IGCR color conversion table for reproducing shades of gray.

Characteristics of the GCR conversion table 66 and the IGCR conversion table 64, which are obtained in the foregoing manner, will be described below. FIGS. 7A through 7C are graphs showing conversion characteristics of color conversion tables for reproducing shades of gray. Each of the graphs has a horizontal axis representing pre-conversion color signal values (%) and a vertical axis representing post-conversion color signal values (%).

The graph illustrated in FIG. 7A shows conversion characteristics of an ordinary color conversion table. The graph does not represent an equivalent transformation (Y=X), but rather represents a linear curve, the gradient of which is much smaller than 1. This is because the total amount of used inks 22 is limited to less than 400%. The respective amounts of used inks 22 are the same at each gradation level of gray.

The graph illustrated in FIG. 7B shows conversion characteristics of the GCR conversion table 66. The K value represents an equivalent transformation (Y=X) in a range of 0≤K≤Th1, and represents a curve with a high gradient in a range of K≥Th1, which is saturated in the vicinity of 100% in a range of high color signal values. Another color (e.g., the C value) represents an equivalent transformation (Y=X) in a range of 0≤C≤Th1, and represents a curve with a low gradient in a range of K≥Th1, which increases monotonically up to a maximum range (100%). In a range beyond Th1, the ratio of K is greater than the ratio of other colors (C, M, Y). As can be seen from FIG. 7B, the GCR conversion table 66 is effective to reduce the total amount of used inks 22 in a range from Th1 to 100%.

The graph illustrated in FIG. 7C shows conversion characteristics of the IGCR conversion table 64. The K value represents 0% at all times in a range of 0≤K≤Th2, and is non-zero and sharply increases in a range of K≥Th2. Another color (e.g., the C value) represents an upwardly convex monotonically increasing function, which reaches a maximum value of 100% at C=Th2, and then gradually decreases in a range of K≥Th2. Within this range, the ratio of K is smaller than the ratio of other colors (C, M, Y). As can be understood from FIG. 7C, the IGCR conversion table 64 is effective to increase the total amount of used inks 22 in a range from 0% to 100%.

As shown in FIG. 3, the color signal value of the pixel of interest is converted according to the IGCR conversion process of the IGCR converter 58 (step S6), or according to the GCR conversion process of the GCR converter 60 (step S7), using the IGCR conversion table 64 or the GCR conversion table 66, which have the above conversion characteristics.

The memory 34 may store a plurality of IGCR conversion tables 64 and a plurality of GCR conversion tables 66 depending on the size (e.g., an allowable color difference Δe) of the isochromatic range R. If the memory 34 stores a plurality of IGCR conversion tables 64 and a plurality of GCR conversion tables 66, then the isochromatic range determiner 46 can select a given combination of an IGCR conversion table 64 and a GCR conversion table 66 by determining in advance the size of the isochromatic range R, in view of the accuracy of color reproduction.

Then, the pixel-of-interest designator 52 determines whether or not the conversion process has been completed on all of the pixels of the image area 100 (step S8). If the pixel-of-interest designator 52 determines that the conversion process has not been completed on all of the pixels, then the pixel-of-interest designator 52 designates another one of the pixels that has not yet been presently designated (step S4). The isochromatic converter 44 then repeats steps S4 through S8 successively.

If the pixel-of-interest designator 52 determines that the conversion process has been completed on all of the pixels, then the color conversion apparatus 12 outputs converted device color signals (C, M, Y, K signals) through the output interface 36 to the image forming apparatus 14 (step S9).

The image forming apparatus 14 converts the supplied device color signals into control signals, which are used in controlling discharge of inks 22 from the recording head assembly 20. The recording head assembly 20 discharges inks 22 based on the supplied control signals. The discharged droplets of inks 22 are applied to the surface of a non-illustrated medium, thereby forming a number of dots on the medium to print an image (print 28). On the print 28, granularity caused by the dots is improved or is prevented from increasing in the first image areas 102, 104, and the cost of used inks 22 is lowered or is prevented from increasing in the second image area 106.

As described above, the first image areas 102, 104, in which image granularity is more important, and the second image area 106, in which the cost of used inks 22 is more important, are extracted from the image area 100, and device color signals are converted such that the total amount of used inks 22 in the first image areas 102, 104 will not be reduced from the total amount before the conversion process, and/or such that the total amount of used inks 22 in the second image area 106 will not be increased from the total amount before the conversion process. Accordingly, it is possible to produce a print 28 that is both low in granularity and low in cost by selectively increasing or reducing the total amount of used inks 22 depending on the image area 100.

The isochromatic converter 44 may convert device color signals in order to increase the total amount of used inks 22 in the first image areas 102, 104 from the total amount before the conversion process. If the total amount of used inks 22 in another image area (the second image area 106 in FIG. 4B) apart from the first image areas 102, 104 is reduced, then the isochromatic converter 44 may convert device color signals in order to prevent the total amount of used inks 22 in the first image areas 102, 104 from being reduced. In this manner, the same advantages as those described above can also be achieved.

The isochromatic converter 44 may also convert device color signals in order to reduce the total amount of used inks 22 in the second image area 106 from the total amount used before the conversion process. If the total amount of used inks 22 in other image areas (the first image areas 102, 104 in FIG. 4B) apart from the second image area 106 is intended to be reduced, then the isochromatic converter 44 may convert device color signals in order to prevent the total amount of used inks 22 in the second image area 106 from being increased. In this manner, the same advantages as those described above can also be achieved.

Figure 8:
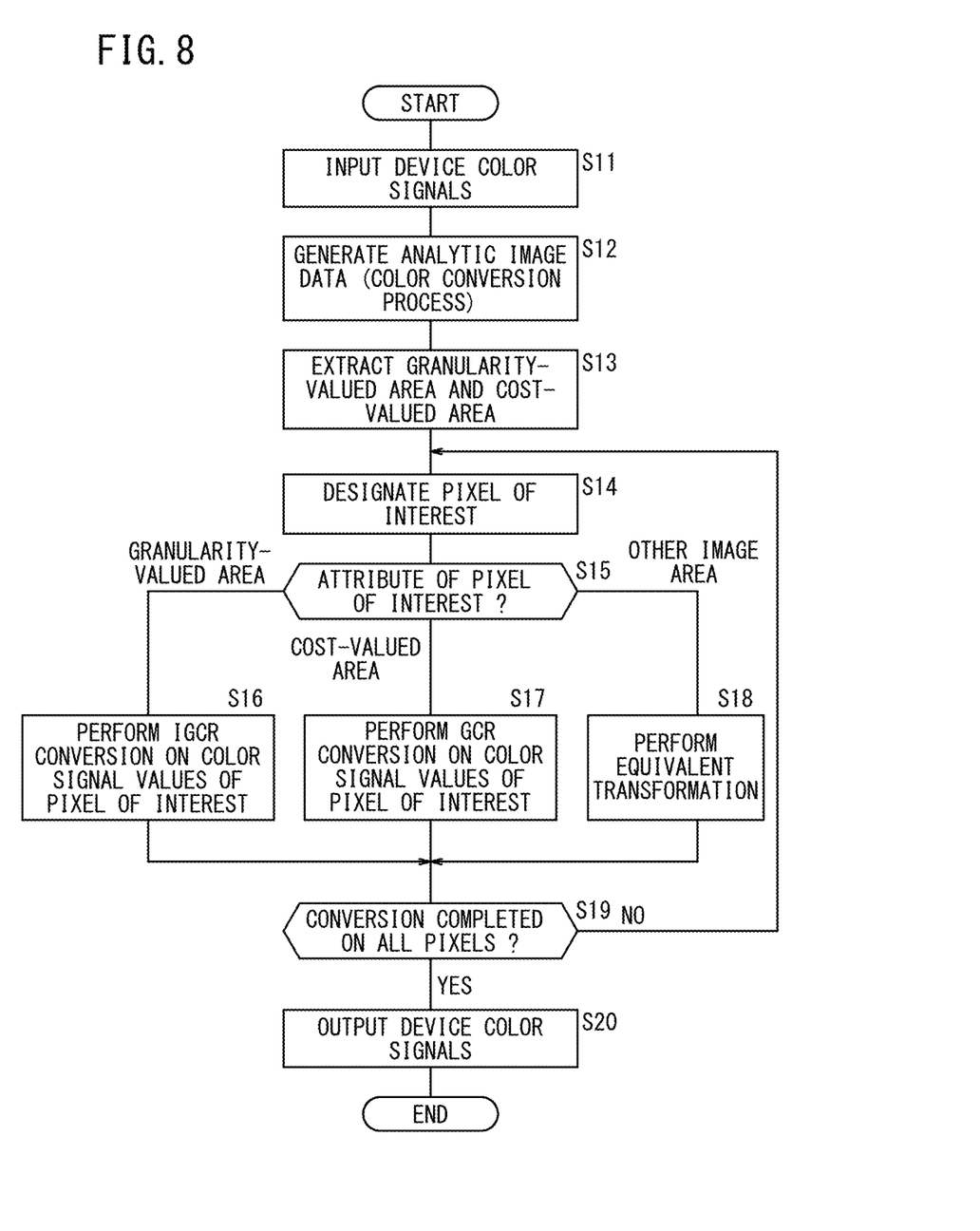
FIG. 8 is a flowchart of an operation sequence implemented by a color conversion apparatus according to a modification of the present invention.

A modification of the present embodiment will be described below with reference to the flowchart shown in FIG. 8. Steps S11, S12, and S20 of FIG. 8 are identical to steps S1, S2, and S9 of FIG. 3 and hence will not be described below.

In step S13, the image area extractor 42 extracts a granularity-valued area and a cost-valued area from an image area 100 represented by the device color signals. In the modified embodiment, the second image area 106 (see FIG. 4), which is a remaining image area, is set as a cost-valued area. Similar to the case of the first image areas 102, 104, the second image area 106 may be extracted according to any of various image detecting algorithms. For example, an image area, the granularity of which is difficult to be recognized visually, may be set as a cost-valued area. More specifically, such an image area may be an image area represented by chromatic colors of relatively low brightness including many high spatial-frequency components.

Similar to the above-described embodiment, color signal values of the device color signals are converted successively for each pixel in steps S14 through S19. However, three color conversion processes (steps S16 through S18) are carried out according to the modification, whereas two color conversion processes (steps S6 and S7) are carried out according to the above-described embodiment.

In step S15, the image area attribute determiner 54 determines the attribute of the present pixel of interest. If the image area attribute determiner 54 determines that the present pixel of interest belongs to the granularity-valued area, the color signal converter 56 uses the IGCR conversion process (step S16). If the image area attribute determiner 54 determines that the present pixel of interest belongs to the cost-valued area, then the color signal converter 56 uses the GCR conversion process (step S17). If the image area attribute determiner 54 judges that the present pixel of interest belongs to another image area, the color signal converter 56 uses an equivalent transformation (step S18). In other words, a color conversion process is not carried out on an image area that does not belong to the granularity-valued area or the cost-valued area.

Therefore, images can be designed strictly depending on the image area 100 by selectively increasing, reducing, or maintaining the total amount of used inks 22. Therefore, prints that are both low in granularity and low in cost can easily be produced.

Alternatively, a plurality of levels for ascribing values to the granularity of images may be established stepwise, and color conversion processes may be selected depending on such levels. The same approach may also be employed with respect to the cost of the used inks 22.

The present invention is not limited to the above embodiment. Various changes and modifications may be made to the embodiment without departing from the scope of the invention.

For example, in the above embodiment, a color conversion process is carried out on each pixel within the image area 100 after a granularity-valued area or a cost-valued area has been extracted. However, a color conversion process may be carried out simultaneously with extraction of a granularity-valued area or a cost-valued area. A designated pixel of interest may be detected as described above and judged as belonging to a granularity-valued area or not, and thereafter, a color conversion process may be performed on the designated pixel of interest.

In the above embodiment, the four color plates in colors of C, M, Y, K have mainly be described. However, the principles of the present invention are also applicable to desired types of color plates and a desired number of color plates. For example, standard inks in colors of C, M, Y, K may be combined with optional inks in pale colors such as LC, LM, or the like, and W (white).

The image forming apparatus 14 is not limited to an inkjet printer, but may be any type of printer capable of producing dots by applying color materials to a print medium.

The invention claimed is:

1. A color conversion apparatus for converting colors of a print that is produced using a plurality of color materials, comprising:
   a color signal input unit for inputting device color signals associated with respective amounts of the color materials;
   an image area extractor for extracting a first image area in which image granularity is more important and/or a second image area in which cost of used color materials is more important, from among an image area represented by the device color signals input by the color signal input unit; and
   an isochromatic converter for converting the device color signals representing the image area into new device color signals, so that the new device color signals will fall within an isochromatic range in a device-independent color space,
   wherein the isochromatic converter converts the device color signals such that a total amount of used color materials in the first image area extracted by the image area extractor is not reduced from a total amount before the device color signals are converted, and/or such that a total amount of the used color materials in the second image area extracted by the image area extractor is not increased from a total amount before the device color signals are converted.

2. The color conversion apparatus according to claim 1, wherein the image area extractor extracts the first image area and/or the second image area, based on a contour of a given object detected in the image area.

3. The color conversion apparatus according to claim 1, wherein the isochromatic converter designates one of a plurality of pixels within the image area as a pixel of interest, and converts the device color signals depending on whether or not the pixel of interest falls within the first image area and/or the second image area.

4. The color conversion apparatus according to claim 1, wherein the isochromatic converter converts the device color signals such that the total amount of the used color materials in the first image area is increased from the total amount before the device color signals are converted.

5. The color conversion apparatus according to claim 1, wherein, if a total amount of used color materials in another image area apart from the first image area is to be reduced, the isochromatic converter converts the device color signals in order to prevent the total amount of the used color materials in the first image area from being reduced.

6. The color conversion apparatus according to claim 4, wherein the color materials include an achromatic color material and a plurality of chromatic color materials, and if the chromatic color materials can be combined to reproduce a color on the print producible by the achromatic color material, the isochromatic converter converts the device color signals such that an amount of used achromatic color material in the first image area is reduced from an amount before the device color signals are converted, and a total amount of used chromatic color materials in the first image area is increased from a total amount before the device color signals are converted.

7. The color conversion apparatus according to claim 6, further comprising:
an isochromatic range determiner for determining the isochromatic range,
wherein the isochromatic converter converts the device color signals so as to fall within the isochromatic range determined by the isochromatic range determiner, and so as to minimize the amount of the used achromatic color material.

8. The color conversion apparatus according to claim 4, wherein the isochromatic converter converts the device color signals such that the total amount of the used color materials in the second image area is reduced from the total amount before the device color signals are converted.

9. The color conversion apparatus according to claim 4, wherein, if the total amount of used color materials in another image area apart from the second image area is to be increased, the isochromatic converter converts the device color signals in order to prevent the total amount of the used color materials in the second image area from being increased.

10. The color conversion apparatus according to claim 8, wherein the color materials include an achromatic color material and a plurality of chromatic color materials, and if the chromatic color materials can be combined to reproduce a color on the print producible by the achromatic color material, the isochromatic converter converts the device color signals such that an amount of used achromatic color material in the second image area is increased from an amount before the device color signals are converted, and a total amount of used chromatic color materials in the second image area is reduced from a total amount before the device color signals are converted.

11. The color conversion apparatus according to claim 10, further comprising:
an isochromatic range determiner for determining the isochromatic range,
wherein the isochromatic converter converts the device color signals so as to fall within the isochromatic range determined by the isochromatic range determiner, and so as to maximize the amount of the used achromatic color material.

12. The color conversion apparatus according to claim 1, wherein the image area extractor extracts, as the second image area, an image area that remains after the first image area is excluded from the image area.

13. The color conversion apparatus according to claim 1, wherein the image area extractor extracts a facial area as the first image area.

14. The color conversion apparatus according to claim 1, wherein the image area extractor extracts, as the first image area, an achromatic flat area in which saturation is smaller than a first threshold value, and in which spatial frequency is lower than a second threshold value.

15. A color conversion method for converting colors of a print that is produced using a plurality of color materials, comprising using a computer to perform the steps of:
inputting device color signals associated with respective amounts of the color materials;
extracting a first image area in which image granularity is more important and/or a second image area in which cost of used color materials is more important, from among an image area represented by the device color signals that have been input; and
converting the device color signals representing the image area into new device color signals, so that the new device color signals will fall within an isochromatic range in a device-independent color space,
wherein the step of converting comprises the step of converting the device color signals such that a total amount of used color materials in the extracted first image area is not reduced from a total amount before the device color signals are converted, and/or such that a total amount of the used color materials in the extracted second image area is not increased from a total amount before the device color signals are converted.

16. A non-transitory recording medium storing a program for converting colors of a print that is produced using a plurality of color materials, the program enabling a computer to function as:
a color signal input unit for inputting device color signals associated with respective amounts of the color materials;
an image area extractor for extracting a first image area in which image granularity is more important and/or a second image area in which cost of used color materials is more important, from among an image area represented by the device color signals input by the color signal input unit; and
an isochromatic converter for converting the device color signals representing the image area into new device color signals, so that the new device color signals will fall within an isochromatic range in a device-independent color space,
wherein the isochromatic converter converts the device color signals such that a total amount of used color materials in the first image area extracted by the image area extractor is not reduced from a total amount before the device color signals are converted, and/or such that a total amount of the used color materials in the second image area extracted by the image area extractor is not increased from a total amount before the device color signals are converted.

\* \* \* \* \*